United States Patent
Francois

(10) Patent No.: US 10,946,414 B2
(45) Date of Patent: Mar. 16, 2021

(54) METHOD FOR IMPREGNATION OF A PART MADE OF PLASTIC MATERIAL

(71) Applicant: The Swatch Group Research and Development Ltd., Marin (CH)

(72) Inventor: Nicolas Francois, Neuchatel (CH)

(73) Assignee: The Swatch Group Research and Development Ltd., Marin (CH)

( * ) Notice: Subject to any disclaimer, the term of this patent is extended or adjusted under 35 U.S.C. 154(b) by 147 days.

(21) Appl. No.: 15/781,895

(22) PCT Filed: Jun. 29, 2016

(86) PCT No.: PCT/EP2016/065211
§ 371 (c)(1),
(2) Date: Jun. 6, 2018

(87) PCT Pub. No.: WO2017/097440
PCT Pub. Date: Jun. 15, 2017

(65) Prior Publication Data
US 2018/0361430 A1    Dec. 20, 2018

(30) Foreign Application Priority Data

Dec. 8, 2015 (EP) ..................................... 15198531

(51) Int. Cl.
*G04B 37/22* (2006.01)
*B05D 3/00* (2006.01)
(Continued)

(52) U.S. Cl.
CPC ............... *B05D 7/02* (2013.01); *B05D 3/007* (2013.01); *C08J 7/02* (2013.01); *C08J 7/04* (2013.01);
(Continued)

(58) Field of Classification Search
CPC ...... B05D 1/18; C08J 7/02; C08J 7/04; G04B 37/226
See application file for complete search history.

(56) References Cited

U.S. PATENT DOCUMENTS

| 4,598,006 A | 7/1986 | Sand |
| 5,340,614 A * | 8/1994 | Perman ................ A61K 9/1647 427/2.24 |

(Continued)

FOREIGN PATENT DOCUMENTS

| CA | 2007781 A1 * | 5/1991 |
| CA | 2007781 A1 | 5/1991 |

(Continued)

OTHER PUBLICATIONS

International Search Report dated Sep. 5, 2016 in PCT/EP2016/065211 filed Jun. 29, 2016.

*Primary Examiner* — Alexander M Weddle
(74) *Attorney, Agent, or Firm* — Oblon, McClelland, Maier & Neustadt, L.L.P.

(57) ABSTRACT

A method for core impregnation of a finished part made of plastic material with an additive, including: dissolving the additive in a liquid medium to form a solution; placing the plastic part at ambient pressure in a pressure enclosure; hermetically sealing the chamber; impregnating the plastic part with the solution by a fluid at supercritical or near supercritical conditions in the enclosure at a pressure between 3 MPa and 6 MPa, at a temperature between 25° C. and 65° C. for a duration between 1 minute and 15 minutes; releasing the pressure inside the enclosure so that the liquid medium diffuses outside the plastic part and to trap the additive inside the plastic part.

18 Claims, 3 Drawing Sheets

(51) Int. Cl.
  *C08J 7/04* (2020.01)
  *B05D 7/02* (2006.01)
  *C08J 7/02* (2006.01)

(52) U.S. Cl.
  CPC ......... *G04B 37/225* (2013.01); *C08J 2353/02* (2013.01); *C08J 2355/02* (2013.01); *C08J 2375/04* (2013.01); *C08J 2375/08* (2013.01); *Y02P 20/54* (2015.11)

(56) References Cited

U.S. PATENT DOCUMENTS

| | | |
|---|---|---|
| 5,508,060 A | 4/1996 | Perman et al. |
| 6,929,702 B1 * | 8/2005 | Motsenbocker ......... C11D 3/43 134/40 |
| 2008/0295457 A1 | 12/2008 | Kaniecki et al. |

FOREIGN PATENT DOCUMENTS

| | | |
|---|---|---|
| EP | 0 200 197 A2 | 11/1986 |
| EP | 0 683 804 B1 | 11/1995 |
| KR | 10-2006-0126329 A | 12/2006 |
| WO | WO 03/085042 A1 | 10/2003 |

* cited by examiner

METHOD FOR IMPREGNATION OF A PART MADE OF PLASTIC MATERIAL

FIELD OF THE INVENTION

The present invention concerns a method for impregnating a part made of plastic material with an additive using a supercritical fluid. More specifically, the invention concerns a method for impregnation of timepieces, and the timepieces obtained.

BACKGROUND OF THE INVENTION

Supercritical $CO_2$ has known commercial applications, such as the thorough cleaning of industrial parts or the extraction of caffeine from coffee.

Numerous impregnation methods using a supercritical fluid have been patented and are known for their rapidity and lower costs. Carbon dioxide is often used for its low cost and very low risks during handling.

Thus, it is known from EP Patent No. 0200197 to impregnate parts made of thermoplastic polymer material with a fragrance material using a fluid at or near supercritical conditions of temperature and pressure. In that document, impregnation is achieved at a pressure of 17 MPa and at a temperature comprised between 25° C. and 60° C. for polymers such as polypropylene, polyethylene, copolymers of ethylene-vinyl acetate (EVA) and ethylene-ethyl acrylate copolymers.

There is known from EP Patent No 0683804 a method for impregnating a polymeric substrate with an additive by means of a supercritical fluid. In that document, impregnation is achieved at a pressure preferably comprised between 7 MPa and 30 MPa and at a temperature comprised between 30° C. and 60° C. for polymers such as polyolefins, polyamides, polyurethanes, silicones, albumin, lactic and glycolic acid polymers, and combinations of the latter.

Thus, impregnation methods using supercritical $CO_2$ have already been disclosed in the prior art. However, none of them discloses a fast, easy to implement method that can be used regardless of the type of polymer materials to be impregnated. Indeed, the methods described are relatively long—two hours or more—and the pressure used is very high, between 7 MPa and 30 MPa.

According to the findings of the inventor, these methods especially do not allow timepieces manufactured from polymer materials to be impregnated while still maintaining a satisfactory quality of such timepieces for the horological industry (tight dimensional tolerances, surface quality and colour quality), and more specifically for copolymer materials such as methyl methacrylate-acrylonitrile-butadiene-styrene (M-ABS) and thermoplastic polyurethane (TPU).

Indeed, following testing, the inventor found that the pressure and temperature parameters used in the prior art for impregnating certain materials led to numerous defects in the materials, or significant deformations or foaming of the part, which is particularly inconvenient for the manufacture of timepieces made of plastic material, for example.

SUMMARY OF THE INVENTION

It is a particular object of the invention to overcome the various drawbacks of these known techniques for application in the horological or jewellery industry.

More specifically, it is an object of the invention to provide a method for core impregnation of finished pieces made of plastic material with an additive that would be too sensitive to temperature or shearing to be added during a conventional blending or moulding process. Such a method also increases the flexibility of production. With such a method, it is possible to create a mould of a single white or transparent reference without additives. This reference is then coloured or functionalized (i.e. provided with a new property) by the method according to the needs of the market.

It is another object of the invention to provide a method that reduces manufacturing time and costs for watches made of plastic material.

These objects, in addition to others which will appear more clearly hereinafter, are achieved according to the invention by a method for the core impregnation of a finished part made of plastic material with at least one additive. According to the invention, the method includes the following steps:

dissolving at least one additive in a liquid medium to form a solution;

placing the plastic part at ambient pressure in a pressure enclosure;

hermetically sealing the enclosure;

impregnating the plastic part with the solution by means of a fluid at supercritical conditions or near supercritical conditions in the enclosure at a pressure comprised between 3 MPa and 6 MPa, at a temperature comprised between 25° C. and 65° C. for a duration preferably comprised between 1 minute and 15 minutes, and more preferentially between 1 minute and 10 minutes;

releasing the pressure inside the enclosure so that the liquid medium diffuses outside the plastic part and in order to trap at least part of the additive inside the plastic part.

In accordance with other advantageous variants of the method of the invention:

the supercritical fluid is carbon dioxide or $CO_2$;

the material is chosen from thermoplastic polyurethanes, polyamides, methyl acrylonitrile butadiene styrene or poly(methyl methacrylate);

the liquid medium is chosen from hexane, isopropanol, d-limonene;

the additive is chosen from dyes, anti-odour agents, fragrances, active cosmetic ingredients;

the plastic material is impregnated with a combination of at least two additives;

impregnation is carried out under constant flow;

the method includes a step of washing the plastic part after releasing the pressure inside the enclosure to eliminate residues;

the washing step is carried out with clean water and using a brush or similar.

The invention also concerns any timepieces and pieces of jewellery made of copolymer material obtained by the method according to the invention.

BRIEF DESCRIPTION OF THE DRAWINGS

Other characteristics and advantages of the invention will appear more clearly upon reading the following description of a specific embodiment of the invention, given simply by way of illustrative and non-limiting example, and the annexed Figures, among which.

DETAILED DESCRIPTION OF PREFERRED EMBODIMENTS

Figure 1:
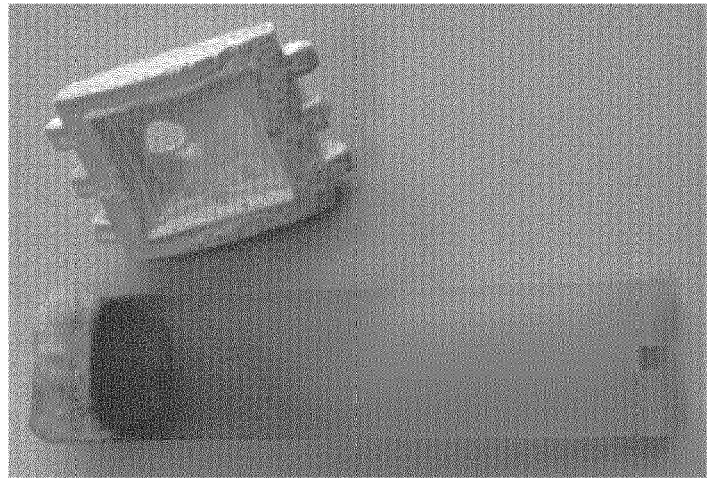
FIG. 1 is a photograph of timepieces made of plastic material illustrating the results of a first test.

The invention concerns a method for the core impregnation of a finished part made of plastic material with at least one additive. According to the invention, the method includes the following steps:
- dissolving at least one additive in a liquid medium to form a solution;
- placing the plastic part at ambient pressure in a pressure enclosure;
- hermetically sealing the chamber;
- impregnating the plastic part with the solution by means of a fluid at supercritical conditions or near supercritical conditions in the enclosure at a pressure comprised between 3 MPa and 6 MPa, at a temperature comprised between 25° C. and 65° C. for a duration preferably comprised between 1 minute and 15 minutes, and even more preferentially between 1 minute and 10 minutes;
- releasing the pressure in the enclosure so that the liquid medium diffuses outside the plastic part and to trap the at least one additive inside the plastic part.

For the purposes of the present invention, a "fluid at supercritical conditions", or "supercritical fluid" means a fluid used at a temperature and pressure higher than its critical point, so that it is placed in a supercritical state and thus more easily dispersed in a material, such as polymers, copolymers or elastomers.

For the purposes of the present invention, a "fluid near supercritical conditions" means a fluid used at a pressure slightly lower than its critical point to obtain a liquid-vapour mixture.

"Core impregnation" means penetration of the additive into the thickness of the material to obtain wear-resistant colouring of the part.

A "finished part" means any ready-to-use machined part, for example following an injection, extrusion, thermoforming or moulding operation.

There are many supercritical fluids for impregnating materials, and a non-reactive and non-toxic supercritical fluid will preferably be used, such as $CO_2$, on the one hand to avoid degrading certain additives, and, on the other hand to treat materials intended to be in contact with the skin to avoid skin reactions.

$CO_2$ also limits the costs of the impregnation operation given the temperature and pressure required to reach its supercritical state.

According to the invention, the pressure is comprised between 3 MPa and 6 MPa, and the temperature is comprised between 25° C. and 65° C.

The inventor found that, beyond these parameters, numerous defects were present in the material of the plastic part according to the polymers used, and particularly for the following thermoplastics which are commonly used to make plastic watches: thermoplastic polyurethanes, polyamides, methyl acrylonitrile butadiene styrene, poly(methyl methacrylate).

An "additive" means, within the meaning of the invention, any organic or inorganic additive, with a density of less than 3 and particle size of less than 50 microns, whether soluble or poorly soluble in a liquid medium. This method is not, therefore, limited to additives soluble in a liquid medium.

According to one embodiment of the invention, the additive may be a dye or a pigment (organic or inorganic). Azo dyes can be mentioned as an example.

The additive may also be an active cosmetic ingredient: hyaluronic acid or ceramides can be mentioned as examples.

The additive may also be an anti-odour agent such as zinc pyrithione, or a fragrance such as essential oils, for example.

According to the invention, the plastic material can be impregnated with a combination of additives. For example, the plastic material can be impregnated with a dye and an anti-odour agent.

For the purposes of the invention, a "liquid medium" means a cosolvent such as hexane, isopropanol or d-limonene.

According to a preferential embodiment of the invention, the method is implemented under constant flux of supercritical $CO_2$, i.e. all the reactants are simultaneously present, and the supercritical $CO_2$ is injected for a determined duration. For example, in the fourth step of the invention, supercritical $CO_2$ is injected for a predetermined duration into the enclosure that receives the mixture obtained in the first step and the part made of plastic material to be impregnated.

According to one embodiment of the invention, the material to be impregnated is chosen from the acrylate or polyurethane family.

The first step of the method according to the invention allows to achieve the intimate mixture of the additive and the cosolvent prior to the diffusion step. "Intimate mixture" means a mixture in which the additive and cosolvent are uniformly distributed (either by dispersion or by dissolution) within the mixture obtained. The first step thus allows to optimise impregnation and obtain better results. The mixture obtained at the end of the first step is thus preferably a liquid mixture to reduce the impregnation time in the fourth step. The first three steps of the method are performed at ambient temperature and pressure.

The fourth step of the method according to the invention allows to impregnate the material with the additive. In a particular embodiment, the fourth step is performed in a hermetically sealed enclosure. The mixture obtained in the first step is introduced into an enclosure with the plastic part to be impregnated, before the enclosure is hermetically sealed. In the third and fourth step of the method, the enclosure is sealed, placed under pressure and brought to the desired temperature for the time necessary for the $CO_2$, which is then near supercritical, to allow the desired degree of impregnation of the plastic part with the additive. The longer the treatment, the more the plastic part will be impregnated, with, however, saturation occurring when the pores of the plastic part are filled.

During the fourth step, the plastic part to be impregnated remains in solid form. In a particular embodiment of the invention, the temperature in the fourth step is comprised between 25 and 65° C. Such temperatures avoid deterioration of the plastic material during impregnation.

In another particular embodiment, the pressure during the fourth step is comprised between 3 MPa and 6 MPa, for example equal to 4 MPa. The advantage of such pressures is that inexpensive infrastructures can be used compared to the prior art.

In a particular embodiment, the contact time in the fourth step is preferably comprised between one minute and fifteen minutes, and more preferentially between one minute and ten minutes, for example equal to five minutes. Such a treatment time allows the plastic pieces to be impregnated quickly and therefore a greater quantity of pieces to be treated.

Depending upon the desired colour, the impregnation time or pressure can be adjusted to obtain a lighter or darker colour.

The fifth step allows to recover and isolate the impregnated plastic part obtained after the fourth step and possibly to separate the additive which has not impregnated the plastic part. For this purpose, the enclosure used is gradually depressurized and cooled. It is then kept at ambient pressure for 2 minutes.

According to the invention, the method may include a step of washing the plastic part, after releasing the pressure inside the enclosure, to eliminate surface residues, such as excess dye for example.

According to a preferential embodiment of the invention, the washing step is preferably performed with clean water and using a brush or equivalent. Low pressure water jets could also be used, or the impregnated pieces could be placed in a bath. The bath could also be stirred and adapted to the cleaning required.

The plastic part impregnated with the additive can be used in the manufacture of timepieces or pieces of jewellery, and more particularly plastic timepieces or pieces of jewellery. In particular, the method can be used in the manufacture of watch cases, wristbands, bezels, crowns, dials, push-buttons, crystals, loops, or any plastic part forming part of a watch or piece of jewellery. The present invention also concerns a timepiece or piece of jewellery made of plastic material, in solid form, and impregnated with an additive by the method according to the present invention as described hereinbefore.

Thus, pre-moulded or pre-machined plastic watch or jewellery components can be impregnated by this method while maintaining the initial properties of the component, particularly its dimensions and mechanical characteristics.

The following examples are given by way of non-limiting illustration. The colouring and impregnation treatments were carried out on watch cases injected, moulded using the materials mentioned.

TABLE 1

| | Material | P (MPa) | T (°C.) | Treatment (mins) | Aeration (mins) | Cosolvent | Results |
|---|---|---|---|---|---|---|---|
| Test 1 | Acrylonitrile Butadiene Styrene | 8.3 | 60 | 45 | 10 | None | Foaming of part |
| Test 2 | Thermoplastic polyurethane (polyether base) 65 Shore A | 7.6 | 50 | 30 | 10 | 6.6% hexane | Foaming of part |
| Test 3 | Acrylonitrile Butadiene Styrene | 6.2 | 55 | 10 | 2 | 1.6% hexane | Foaming of part |
| Test 4 | Methyl methacrylate butadiene styrene | 5.5 | 35 | 10 | 2 | 1.6% hexane | Foaming of part |
| Test 5 | Methyl methacrylate butadiene styrene | 4 | 35 | 10 | 2 | 1.6% hexane | Colouring only to depth of 100 microns |
| Test 6 | Methyl methacrylate butadiene styrene | 1.5 then 5.5 | 45 | 5 then 10 | 2 | 1.6% hexane | Colouring not complete throughout thickness |

TABLE 2

| | Material | P (MPa) | T (°C.) | Treatment (mins) | Aeration (mins) | Cosolvent | Results |
|---|---|---|---|---|---|---|---|
| Test 7 | Methyl methacrylate butadiene styrene | 5.5 | 60 | 13 | 2 | 1.6% hexane | Slight foaming giving whiteish appearance |
| Test 8 | Methyl methacrylate butadiene styrene | 4 | 100 | 10 | 10 | 1.6% hexane | Very significant foaming |
| Test 9 | Methyl methacrylate butadiene styrene | 4 | 60 | 10 | 10 | 1.6% hexane | Good colour, but very slight surface whitening |
| Test 10 | Methyl methacrylate butadiene styrene/ Thermoplastic polyurethane | 4 | 50 | 10 | 10 | 1.6% hexane | Homogeneous colour with no foaming, but slight surface whitening |
| Test 11 | Methyl methacrylate butadiene styrene | 4 | 50 | 5 | 5 | 1.6% hexane | Slightly lighter homogeneous colour |
| Test 12 | Thermoplastic polyurethane (polyether base) 65 Shore A | 4 | 50 | 5 | 5 | 1.6% hexane | Homogeneous colour |

In both of these tables, the same additives were used, namely an azo dye, Chromophtal®, and an aromatic hydrocarbon, anthraquinone (Oracet®). Only one cosolvent is used, hexane, and three plastic materials were tested: acrylonitrile butadiene styrene, thermoplastic polyurethane (polyether base) and methyl methacrylate butadiene styrene.

Figure 2:
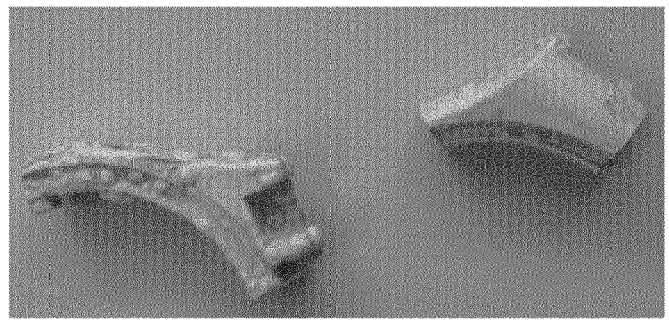
FIG. 2 is a photograph of timepieces made of plastic material illustrating the results of a second test.

In FIG. 1, which corresponds to tests 1 and 2, complete deformation of the part due to foaming and a non-uniform colour can be seen. These same results are seen in FIG. 2 for tests 3 and 4; deformations are visible in the parts.

Figure 3:
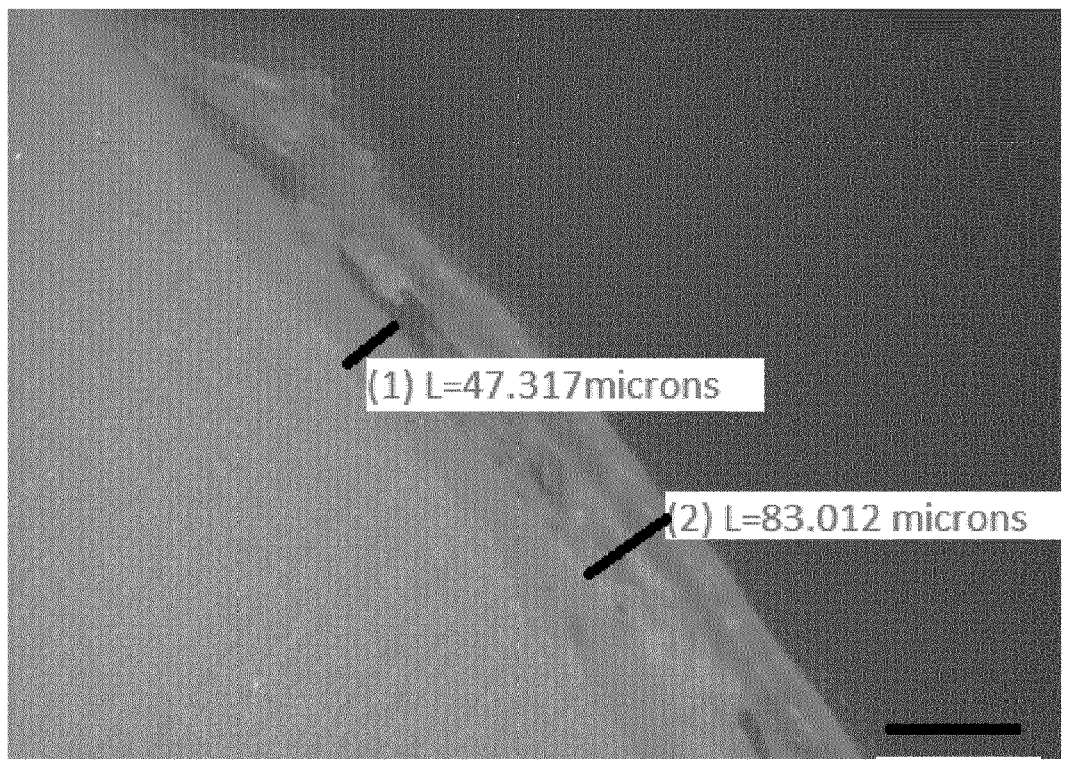
FIG. 3 is a photograph of a cross-section of a timepiece made of plastic material illustrating the results of a third test.

In FIG. 3, which corresponds to test 5, it is seen that the part is only coloured on the surface and to a very shallow depth; the dye has not penetrated sufficiently deeply to provide satisfactory and long-lasting colouring despite wear.

Figure 4:
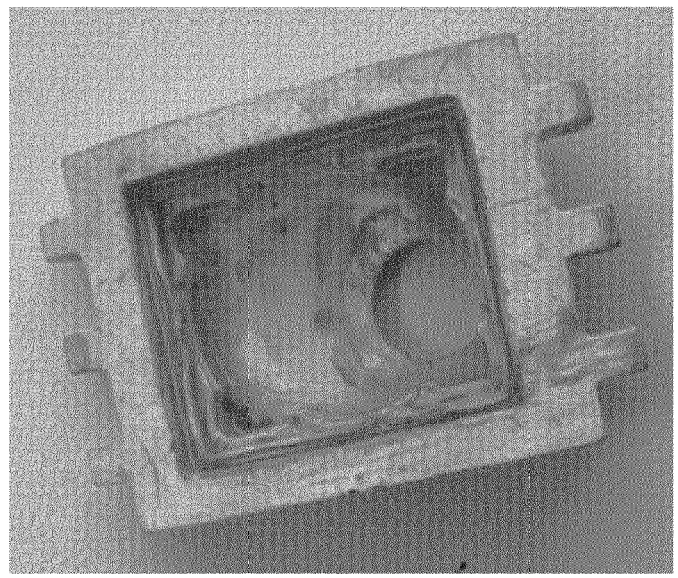
FIG. 4 is a photograph of a timepiece made of plastic material illustrating the results of a fourth test.

In FIG. 4, corresponding to test 7, whitening of the part is seen after impregnation, which is unacceptable.

Figure 5:
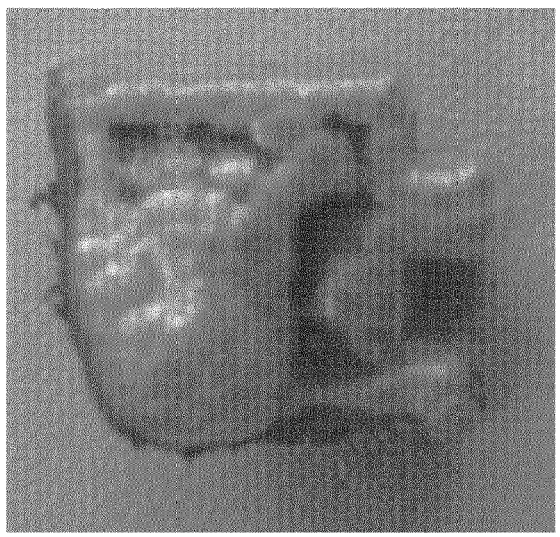
FIG. 5 is a photograph of a timepiece made of plastic material illustrating the results of a fifth test.

In FIG. 5, corresponding to test 8, significant foaming of the part is seen after impregnation, which makes it unusable.

Figure 6:
FIG. 6 is a photograph of a timepiece made of plastic material illustrating the results of a sixth test.

FIG. 6 illustrates the result of test 9, slight whitening is seen at the surface of the part following impregnation due to migration of waxes used in the MABS plastic as agent for implementation; however, the colouring is satisfactory.

Figure 7:
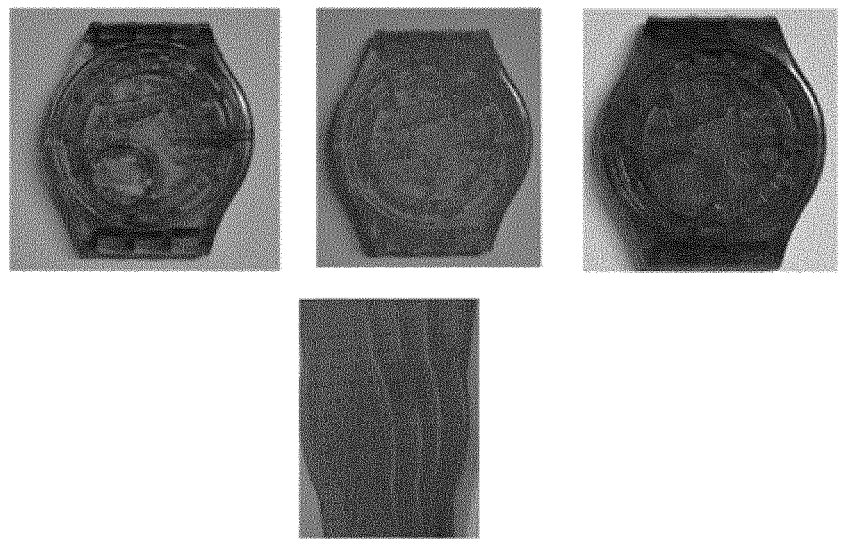
FIG. 7 is a photograph of timepieces made of plastic material illustrating the results of a seventh test.

FIG. 7 illustrates parts coloured according to the conditions of test 10. Homogeneous, good quality colouring is seen with no deformation of the plastic parts. However, a very slight white cloudiness is visible at the surface, indicating the start of migration of some plastic additives.

Figure 8:
FIG. 8 is a photograph of a timepiece made of plastic material illustrating the results of an eighth test.

FIG. 8 illustrates two methacrylate butadiene styrene parts corresponding to test 11. Homogeneous colouring with no deformation and no whitening is seen.

Figure 9:
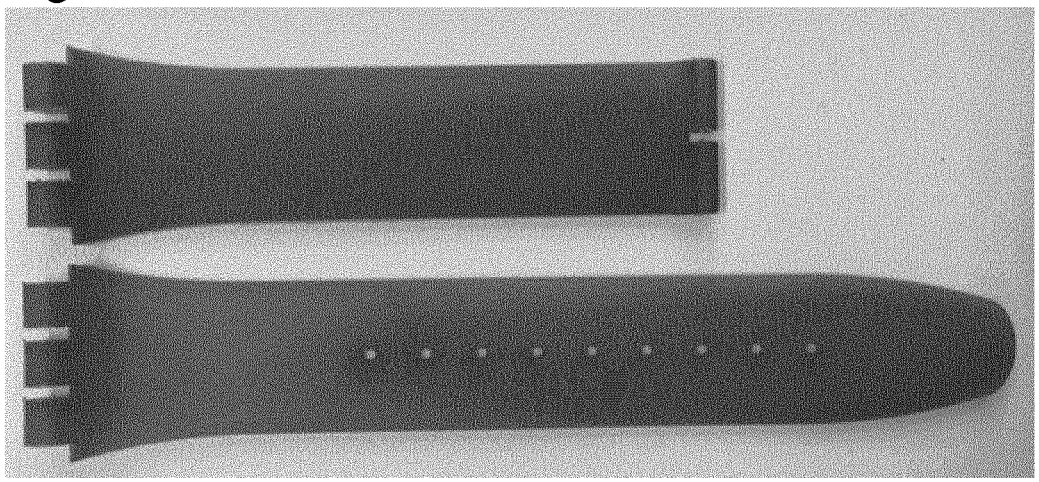
FIG. 9 is a photograph of a timepiece made of plastic material illustrating the results of a ninth test.

FIG. 9 illustrates two thermoplastic polyurethane parts corresponding to test 12. Homogeneous colouring with no deformation and no whitening is seen.

Of course, the present invention is not limited to the illustrated example and is capable of various variants and modifications that will appear to those skilled in the art.

The invention claimed is:

1. A method for core impregnation of a finished part made of plastic material with at least one additive, the method comprising:
    dissolving the at least one additive in a liquid medium to form a solution;
    placing a plastic part at ambient pressure in a pressure enclosure;
    hermetically sealing the chamber;
    impregnating the plastic part with the solution by carbon dioxide in the enclosure at a pressure between 3 MPa and 6 MPa, at a temperature between 40° C. and 65° C. for a duration between 1 minute and 10 minutes;
    releasing the pressure inside the enclosure so that the liquid medium diffuses outside the plastic part and to trap the at least one additive inside the plastic part,
    wherein the plastic part is a watch case, a watch wristband, a watch bezel, a watch crown, a watch dial, a watch push-button, a watch crystal, or a watch loop.

2. The method according to claim 1, wherein the material is a thermoplastic material chosen from polyurethanes, polyamides, methyl acrylonitrile butadiene styrene, or poly(methyl methacrylate).

3. The method according to claim 1, wherein the liquid medium is chosen from hexane, isopropanol, or d-limonene.

4. The method according to claim 1, wherein the additive is chosen from dyes, anti-odour agents, or fragrances.

5. The method according to claim 4, wherein the additive includes a combination of at least two additives.

6. The method according to claim 1, wherein the impregnation is carried out with the carbon dioxide under constant flux.

7. The method according to claim 1, further comprising washing the part made of plastic material to eliminate residues.

8. The method according to claim 7, wherein the washing is carried out with clean water and using a brush.

9. The method according to claim 1, wherein the impregnating includes impregnating the plastic part with the solution by the carbon dioxide in the enclosure at the pressure of 4 MPa, at the temperature between 50° C. and 60° C. for a duration between 5 minutes and 10 minutes.

10. The method according to claim 1, wherein the additive is a hyaluronic acid or ceramide.

11. A method for core impregnation of a finished part made of plastic material with at least one additive, the method comprising:
    dissolving the at least one additive in a liquid medium to form a solution, wherein the at least one additive is a hyaluronic acid or ceramide;
    placing a plastic part at ambient pressure in a pressure enclosure;
    hermetically sealing the chamber;
    impregnating the plastic part with the solution by carbon dioxide in the enclosure at a pressure between 3 MPa and 6 MPa, at a temperature between 40° C. and 65° C. for a duration between 1 minute and 10 minutes;
    releasing the pressure inside the enclosure so that the liquid medium diffuses outside the plastic part and to trap the at least one additive inside the plastic part.

12. The method according to claim 11, wherein the material is a thermoplastic material chosen from polyurethanes, polyamides, methyl acrylonitrile butadiene styrene, or poly(methyl methacrylate).

13. The method according to claim 11, wherein the liquid medium is chosen from hexane, isopropanol, or d-limonene.

14. The method according to claim 13, wherein the additive includes a combination of at least two additives.

15. The method according to claim 11, wherein the impregnation is carried out with the carbon dioxide under constant flux.

16. The method according to claim 11, further comprising washing the part made of plastic material to eliminate residues.

17. The method according to claim 16, wherein the washing is carried out with clean water and using a brush.

18. The method according to claim 11, wherein the impregnating includes impregnating the plastic part with the solution by the carbon dioxide in the enclosure at the pressure of 4 MPa, at the temperature between 50° C. and 60° C. for a duration between 5 minutes and 10 minutes.

* * * * *